(12) United States Patent  
Schoolcraft (10) Patent No.: US 9,746,040 B2  
(45) Date of Patent: Aug. 29, 2017

(54) MECHANICALLY-ACTUATED DIRECTION-SENSING ROLLER CLUTCH

(71) Applicant: Allison Transmission, Inc., Indianapolis, IN (US)

(72) Inventor: Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 592 days.

(21) Appl. No.: 13/774,837

(22) Filed: Feb. 22, 2013

(65) Prior Publication Data

US 2014/0069761 A1    Mar. 13, 2014

Related U.S. Application Data

(60) Provisional application No. 61/602,252, filed on Feb. 23, 2012.

(51) Int. Cl.
*F16D 41/064* (2006.01)
*F16D 41/08* (2006.01)
(Continued)

(52) U.S. Cl.
CPC ......... *F16D 41/064* (2013.01); *F16D 41/088* (2013.01); *F16D 41/105* (2013.01); *F16H 37/084* (2013.01)

(58) Field of Classification Search
CPC .... F16D 41/064; F16D 41/066; F16D 41/086; F16D 41/088; F16D 2041/0665
See application file for complete search history.

(56) References Cited

U.S. PATENT DOCUMENTS

| 3,324,744 A | 6/1967 | Roper |
| 3,481,436 A | 12/1969 | Wilkowski |

(Continued)

FOREIGN PATENT DOCUMENTS

| CN | 201342963 Y | 11/2009 |
| CN | 101852258 A | 10/2010 |

(Continued)

OTHER PUBLICATIONS

International Search Report and Written Opinion received for PCT International Application No. PCT/US2013/027472, mailed May 9, 2013, 10 pages.

(Continued)

*Primary Examiner* — Huan Le
(74) *Attorney, Agent, or Firm* — Barnes & Thornburg LLP (57) ABSTRACT

A roller clutch including an outer race, an inner race, a first engagement member situated between the outer race and the inner race, and a second engagement member situated between the outer race and the inner race. The first engagement member is configured to engage the outer race and the inner race to transmit torque between the outer race and the inner race only in response to the inner race turning in a positive direction and applying negative torque to the first engagement member. The second engagement member is configured to engage the outer race and the inner race to transmit torque between the outer race and the inner race in response to the inner race applying positive torque to the second engagement member while the outer race applies negative torque to the second engagement member.

9 Claims, 7 Drawing Sheets

(51) Int. Cl.
*F16D 41/10* (2006.01)
*F16H 37/08* (2006.01)

(56) References Cited

U.S. PATENT DOCUMENTS

| | | | |
|---|---|---|---|
| 3,631,741 A | 1/1972 | Kelbel | |
| 4,114,478 A | 9/1978 | Clauss | |
| 4,361,217 A | 11/1982 | Bieber et al. | |
| 4,381,828 A | 5/1983 | Lunn et al. | |
| 4,813,524 A | 3/1989 | Reik | |
| 5,152,726 A | 10/1992 | Lederman | |
| 5,355,981 A | 10/1994 | Itoh et al. | |
| 5,407,024 A | 4/1995 | Watson et al. | |
| 5,538,121 A | 7/1996 | Hering | |
| 5,584,776 A | 12/1996 | Weilant et al. | |
| 5,653,322 A | 8/1997 | Vasa et al. | |
| 5,662,198 A | 9/1997 | Kojima et al. | |
| 5,704,867 A | 1/1998 | Bowen | |
| 5,771,477 A | 6/1998 | Showalter et al. | |
| 5,833,566 A | 11/1998 | Showalter | |
| 5,884,526 A | 3/1999 | Fogelberg | |
| 5,893,812 A | 4/1999 | Narai et al. | |
| 5,918,715 A | 7/1999 | Ruth et al. | |
| 5,992,592 A | 11/1999 | Showalter | |
| 5,996,758 A | 12/1999 | Baxter | |
| 6,062,361 A | 5/2000 | Showalter | |
| 6,149,540 A | 11/2000 | Johnson et al. | |
| 6,149,543 A | 11/2000 | Breen | |
| 6,155,395 A | 12/2000 | Braford | |
| 6,251,045 B1 | 6/2001 | Oliveira et al. | |
| 6,569,051 B2* | 5/2003 | Hirano | F16H 61/6648 192/44 |
| 6,588,559 B2 | 7/2003 | Blair | |
| 6,672,442 B2 | 1/2004 | Kato et al. | |
| 6,834,750 B2 | 12/2004 | Baker et al. | |
| 6,846,257 B2 | 1/2005 | Baker et al. | |
| 7,052,430 B2 | 5/2006 | Stevenson et al. | |
| 7,189,182 B2 | 3/2007 | Stevenson et al. | |
| 7,204,337 B2 | 4/2007 | Wildfellner | |
| 7,219,569 B2 | 5/2007 | Jastrzembowski et al. | |
| 8,152,673 B2 | 4/2012 | Yanay | |
| 8,298,112 B2 | 10/2012 | Takada | |
| 9,097,298 B2* | 8/2015 | Schoolcraft | |
| 2002/0037786 A1 | 3/2002 | Hirano et al. | |
| 2003/0019708 A1 | 1/2003 | Goto et al. | |
| 2003/0051959 A1* | 3/2003 | Blair | B60K 23/06 192/21 |
| 2003/0226415 A1 | 12/2003 | Baker et al. | |
| 2004/0104096 A1 | 6/2004 | Genise | |
| 2004/0116226 A1 | 6/2004 | Baker et al. | |
| 2005/0133329 A1 | 6/2005 | Gradu et al. | |

FOREIGN PATENT DOCUMENTS

| | | |
|---|---|---|
| WO | 9214074 A1 | 8/1992 |
| WO | 2010048029 A2 | 4/2010 |

OTHER PUBLICATIONS

Examiner's First Report from the Australian Government for Application No. 2013222182, dated Mar. 23, 2016, 3 pages.
Search Report and Written Opinion from the State Intellectual Property Office for the People's Republic of China for Application No. 201380020261.3, dated Mar. 22, 2016, 19 pages.
Examiner's First Report from the Australian Government for Application No. 2013222178, dated May 27, 2016, 3 pages.
Search Report and Written Opinion from the State Intellectual Property Office for the People's Republic of China for Application No. 201380020235.0, dated Apr. 27, 2016, 11 pages.
European Search Report and Written Opinion for Application No. 13751648.0, dated May 19, 2016, 7 pages.
European Search Report and Written Opinion for Application No. 13751315.6, dated Jun. 29, 2016, 6 pages.
International Preliminary Report on Patentability for Application No. PCT/US2013/027472, dated Nov. 11, 2014, 8 pages.
International Preliminary Report on Patentability for Application No. PCT/2013/027468, dated Oct. 28, 2014, 8 pages.
Second Office Action from the State Intellectual Property Office for the People's Republic of China for Application No. 201380020261.3, dated Jan. 12, 2017, 7 pages.

* cited by examiner

MECHANICALLY-ACTUATED DIRECTION-SENSING ROLLER CLUTCH

CROSS-REFERENCE TO RELATED U.S. PATENT APPLICATION

This present application claims priority under 35 U.S.C. §119(e) to U.S. Provisional Patent Application Ser. No. 61/602,252, entitled "MECHANICALLY ACTUATED DIRECTION SENSING ROLLER CLUTCH" by Brian Schoolcraft, which was filed on Feb. 23, 2012, the entirety of which is hereby incorporated by reference.

TECHNICAL FIELD

The present disclosure relates generally to roller clutches, and more particularly, to a direction-sensing roller clutch for use in a transmission.

BACKGROUND

Transmissions are used to transfer a drive torque from a drive unit to a load. For example, a vehicle transmission transfers the drive torque from the vehicle engine to the vehicle load. Some transmissions include a finite set of gears, which may be selected to produce a specific transmission ratio. Other transmissions may include a ratio varying unit ("variator") to provide a substantially continuous variation of transmission ratio rather than a series of predetermined transmission ratios. Such transmissions are typically referred to as continuously variable transmissions (CVTs), infinitely variable transmissions (IVTs), toroidal transmissions, and/or the like.

Figure 6:
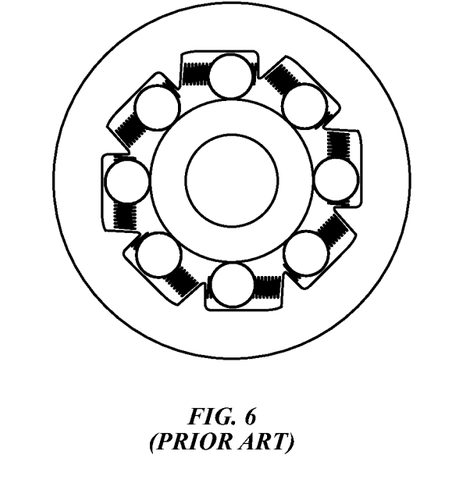
FIG. 6 is an axial, elevation view of a conventional roller clutch.
Figure 7A:
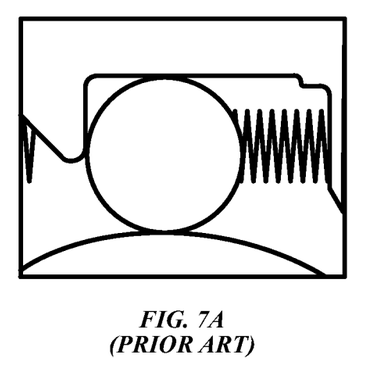
FIGS. 7A-7D are axial views of a segment of the conventional roller clutch of FIG. 6.
Figure 7B:
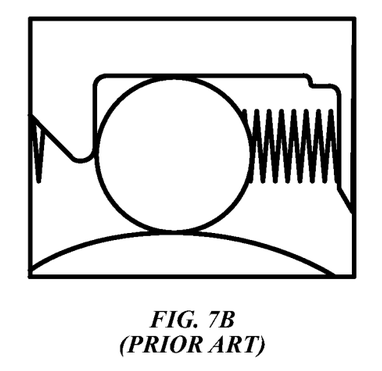
Figure 7C:
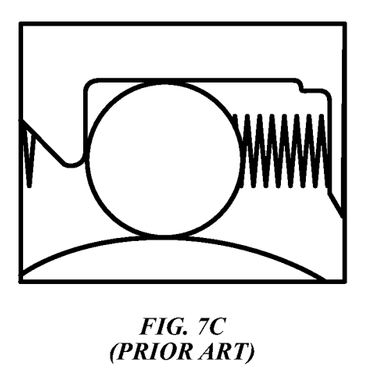
Figure 7D:
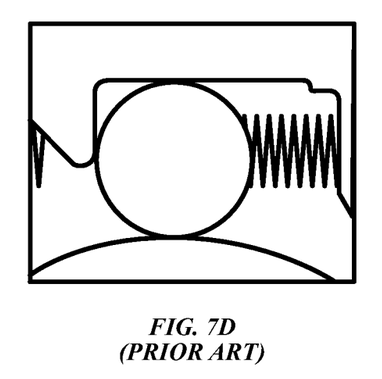

Typical transmissions include one or more clutches. One type of clutch that may be used in a transmission, as well as other devices is known as a roller clutch. Conventional roller clutches can be used as one-way or overrunning clutches to allow freewheeling of an output (e.g., an output shaft) relative to an input (e.g., an input shaft) depending on the torque interaction of the input and output. For example, vehicle transmissions may include one-way clutches, such as a roller clutch, sensitive to torque differentials to connect an input shaft to an output shaft to allow freewheeling of a drive train between a drive unit and a vehicle load when direct connection of the drive unit to the vehicle load is undesirable. One example of such a conventional roller clutch is shown in FIGS. 6-7D. Similar devices such as sprag clutches and ratchets can also be used to provide one-way or overrunning clutch relationships between inputs and outputs.

SUMMARY

According to one aspect of the present disclosure, a transmission may include a rotational receiver, a variable transmission unit, and a direction-sensing roller clutch. The direction-sensing roller clutch may include an inner race coupled to one of the rotational receiver or the variable transmission unit and an outer race coupled to the other of the rotational receiver or the variable transmission unit. The direction-sensing roller clutch may be configured to transmit torque between the inner race and the outer race so that torque is transmitted between the rotational receiver and the variable transmission unit unless the rotational receiver both turns in a negative direction and applies negative torque.

In some embodiments, the direction-sensing roller clutch may include a first engagement member situated between the outer race and the inner race. The first engagement member may be configured to engage the outer race and the inner race to transmit torque between the outer race and the inner race only in response to the rotational receiver turning in a positive direction and applying negative torque.

The direction-sensing roller clutch may include a second engagement member situated between the outer race and the inner race. The second engagement member may be configured to transmit torque between the outer race and the inner race in response to the rotational receiver applying positive torque while the variable transmission unit applies negative torque.

The direction-sensing roller clutch may include an actuator configured to move the first engagement member into contact with the outer race and the inner race. The actuator may be coupled through a planetary gear set to a rotational resistor. The actuator may be coupled to a planetary gear set.

In some embodiments, the planetary gear set may include a carrier coupled for common rotation with the rotational receiver. The actuator may be coupled for common rotation with a ring gear included in the planetary gear set. The planetary gear set may include a sun gear directly coupled to a rotational resistor.

According to another aspect of the present disclosure, a roller clutch may include an outer race, an inner race, a first engagement member situated between the outer race and the inner race, and a second engagement member situated between the outer race and the inner race. The first engagement member may be configured to engage the outer race and the inner race to transmit torque between the outer race and the inner race only in response to the inner race turning in a negative direction and applying negative torque to the first engagement member. The second engagement member may be configured to engage the outer race and the inner race to transmit torque between the outer race and the inner race in response to the inner race applying positive torque to the second engagement member while the outer race applies negative torque to the second engagement member.

In some embodiments, the roller clutch may include an actuator. The actuator may be configured to move the first engagement member into contact with at least one of the outer race and the inner race.

The first engagement member may be biased away from engagement with at least one of the outer race and the inner race by a first spring. The second engagement member may be biased toward engagement with the outer race and the inner race by a second spring.

It is contemplated that the actuator may be coupled to a rotational resistor configured to apply a resistive torque to the inner race. The actuator may be coupled to a planetary gear set including a sun gear. The sun gear may be directly coupled to the rotational resistor.

In yet another aspect of the present disclosure, a drive train for driving a load is taught. The drive train may include a drive unit with a drive unit output shaft and a transmission coupled to the drive unit. The transmission may be configured to transfer torque between the drive unit and the load unless the drive unit output shaft turns in a negative direction and applies a negative torque to the transmission.

In some embodiments, the transmission may include a variable transmission unit and a direction-sensing roller clutch. The direction-sensing roller clutch may be coupled between the drive unit and the variable transmission unit. The direction-sensing roller clutch may include an inner race coupled for common rotation with one of the drive unit output shaft or a variable transmission unit input shaft, an outer race coupled for common rotation with the other of the drive unit output shaft or the variable transmission unit input shaft, and a clutch engagement assembly situated between the inner race and the outer race.

The clutch engagement assembly may include a first engagement member. The first engagement member may be configured to transmit torque between the drive unit output shaft and the variable transmission input shaft only in response to the drive unit output shaft both turning in a positive direction and applying torque in the negative direction.

The clutch engagement assembly may include a second engagement member. The second engagement member may be configured to transmit torque between the drive unit output shaft and the variable transmission input shaft in response to the drive unit output shaft applying torque in the positive direction while the variable transmission input shaft applies torque in the negative direction.

In some embodiments, the direction-sensing roller clutch may include an actuator. The actuator may be configured to move the first engagement member into contact with the outer race and the inner race. The actuator may be coupled to a planetary gear set including a sun gear. The sun gear may be directly coupled to a rotational resistor configured to apply a reaction torque on the sun gear in a direction opposing torque applied by the input shaft.

It is contemplated that the planetary gear set may include a carrier supporting a plurality of planetary gears. The carrier may be coupled for common rotation with the input shaft. The planetary gear set may include a ring gear intermeshing with each of the plurality of planetary gears and coupled for common rotation with the actuator.

DESCRIPTION OF THE DRAWINGS

The systems and methods described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
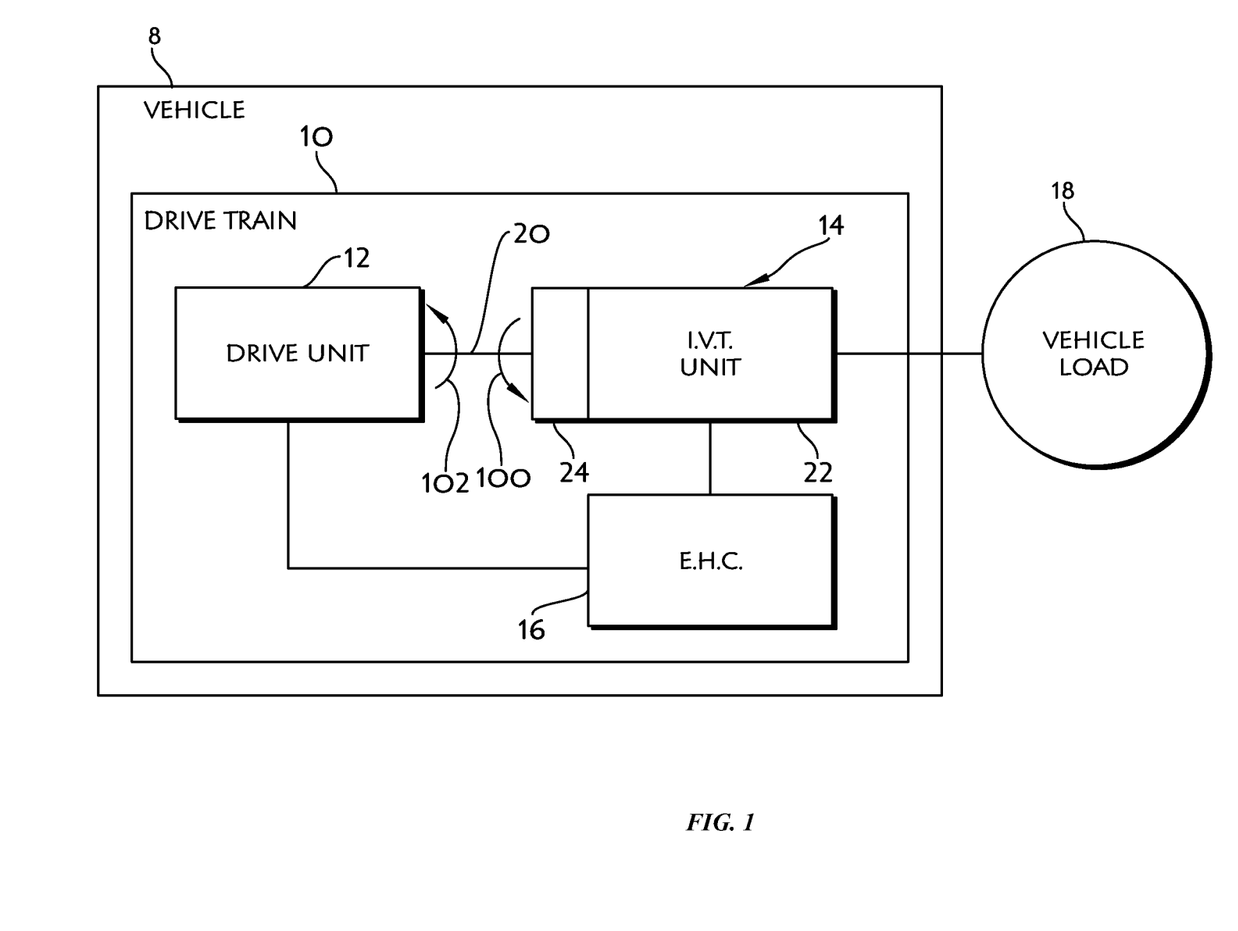
FIG. 1 is a diagrammatic view of at least one embodiment of a vehicle drive train including a drive unit, a transmission, and an electro-hydraulic control.

Referring to FIG. 1, in one embodiment, a drive train 10 of a vehicle 8 includes a drive unit 12 and a transmission 14 configured to drive a vehicle load 18. The drive train 10 also includes an electro-hydraulic control system 16 coupled to the drive unit 12 and the transmission 14 to coordinate the operation of the drive unit 12 and the transmission 14 as discussed in more detail below. Additionally, in some embodiments, the drive train 10 may include other components commonly found in drive trains but not illustrated in FIG. 1 in order to increase clarity of the present description.

The drive unit 12 is illustratively embodied as a diesel internal combustion engine. However, in other embodiments, the drive unit 12 may be embodied as a spark-ignition type internal combustion engine (i.e. gasoline engine), a hybrid engine-electric motor combination, or another source of rotational power. The drive unit 12 includes a drive unit output shaft 20 that provides rotational power to the transmission 14. As a convention throughout this description, the term "positive direction" refers to a clockwise direction when looking from the drive unit 12 toward the transmission 14 as indicated by an arrow 100 in FIG. 1. The term "negative direction" refers to a counter-clockwise direction when looking from the drive unit 12 toward the transmission 14 indicated by an arrow 102 in FIG. 1. This convention will be used when referring to the direction of either speed or torque.

The transmission 14 is operable to transmit the rotational power from the drive unit 12 to the vehicle load 18 at various transmission ratios. The transmission ratio provided by the transmission 14 is controlled by the electro-hydraulic control system 16. For example, the electro-hydraulic control system 16 is configured to modify the transmission ratio during operation so that the drive unit 12 operates at an optimized set of as a function of the vehicle load 18 and the speed of the vehicle 8.

Figure 2:
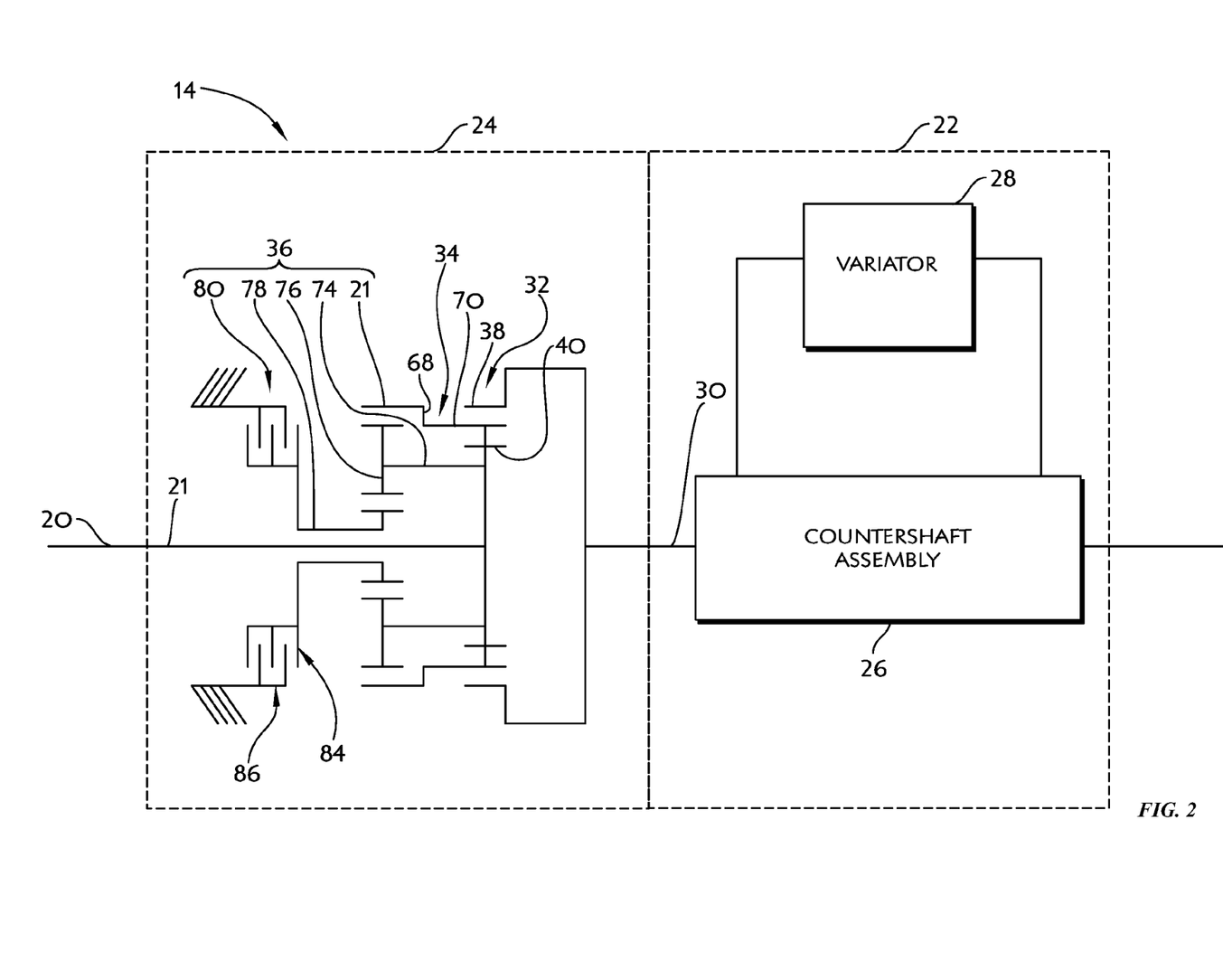
FIG. 2 is a schematic diagram of at least one embodiment of the transmission setoff of the vehicle drive train of FIG. 1.

As shown in FIG. 2, the transmission 14 illustratively includes a rotational receiver 21, a variable transmission unit 22, and a direction-sensing roller clutch 24 configured to prevent or otherwise resist the drive unit 12 from driving the variable transmission unit 22 in a negative direction. The rotational receiver 21 may be embodied as an input shaft, gear, coupling, sprocket, or other device capable of coupling with the drive unit output shaft 20 for common rotation therewith. As such, the rotational receiver 21 may form an integral part of the direction-sensing roller clutch 24 in some embodiments or may be embodied as a component of the drive train 10 separate from the direction-sensing roller clutch but coupled therewith. The variable transmission unit 22 is illustratively embodied as an infinitely variable countershaft transmission unit. However, in other embodiments, the variable transmission unit 22 may be embodied as a continuously variable transmission unit or a "standard" transmission unit configured to provide a finite number of geared ratios. The direction-sensing roller clutch 24 couples the drive unit 12 to the variable transmission unit 22 via the rotational receiver 21 so that torque is transferred between the drive unit 12 and the variable transmission unit 22 through the direction-sensing roller clutch 24, except in situations where the drive unit output shaft 20 turns in a negative direction and applies negative torque to the direction-sensing roller clutch 24. For example, such a situation may occur immediately after shutdown of a diesel engine where pressure built up in the cylinders of the engine resists positive rotation and produces a "kick back."

The variable transmission unit 22 includes a countershaft assembly 26 and a variator 28 as shown diagrammatically in FIG. 2. The illustrative variable transmission unit 22 has a variable forward speed mode, a variable reverse speed mode, and a driven neutral mode. The countershaft assembly 26 is coupled to the direction-sensing roller clutch 24 by a variable transmission input shaft 30 that turns in a positive direction to drive the variable transmission unit 22 during operation of the transmission 14. The variator 28 is illustratively embodied as a toroidal variator having a plurality of rollers. However, in other embodiments, the variator 28 may be embodied as a friction-cone type variator or another suitable variable transmission configuration. The countershaft assembly 26 and the variator 28 cooperate to provide a substantially infinitely variable transmission unit. As with typical variable transmission units, rotation of the variable transmission input shaft 30 in a negative direction could result in the reversal of the variator 28, which may damage rollers, cones, or other components of the variator 28. As such, the direction-sensing roller clutch 24 is configured to prevent or otherwise restrict such negative rotation as discussed in more detail below.

The direction-sensing roller clutch 24 includes a clutch engagement assembly 32, an engagement actuator 34, and an actuation planetary gear set 36 as shown in FIG. 2. The clutch engagement assembly 32 transmits torque between the rotational receiver 21 of the transmission 14 and the variable transmission input shaft 30 when the clutch engagement assembly 32 is engaged. The clutch engagement assembly 32 is biased toward engagement when the drive unit output shaft 20 applies a positive torque to the rotational receiver 21 of the transmission 24 and biased out of engagement when the drive unit output shaft 20 applies a negative torque. However, as discussed in more detail, the engagement actuator 34 is configured to move the clutch engagement assembly 32 to an engaged configuration when the drive unit output shaft 20 applies a negative torque but is turning in the positive direction thereby making direction-sensing roller clutch 24 direction-sensitive.

Figure 3:
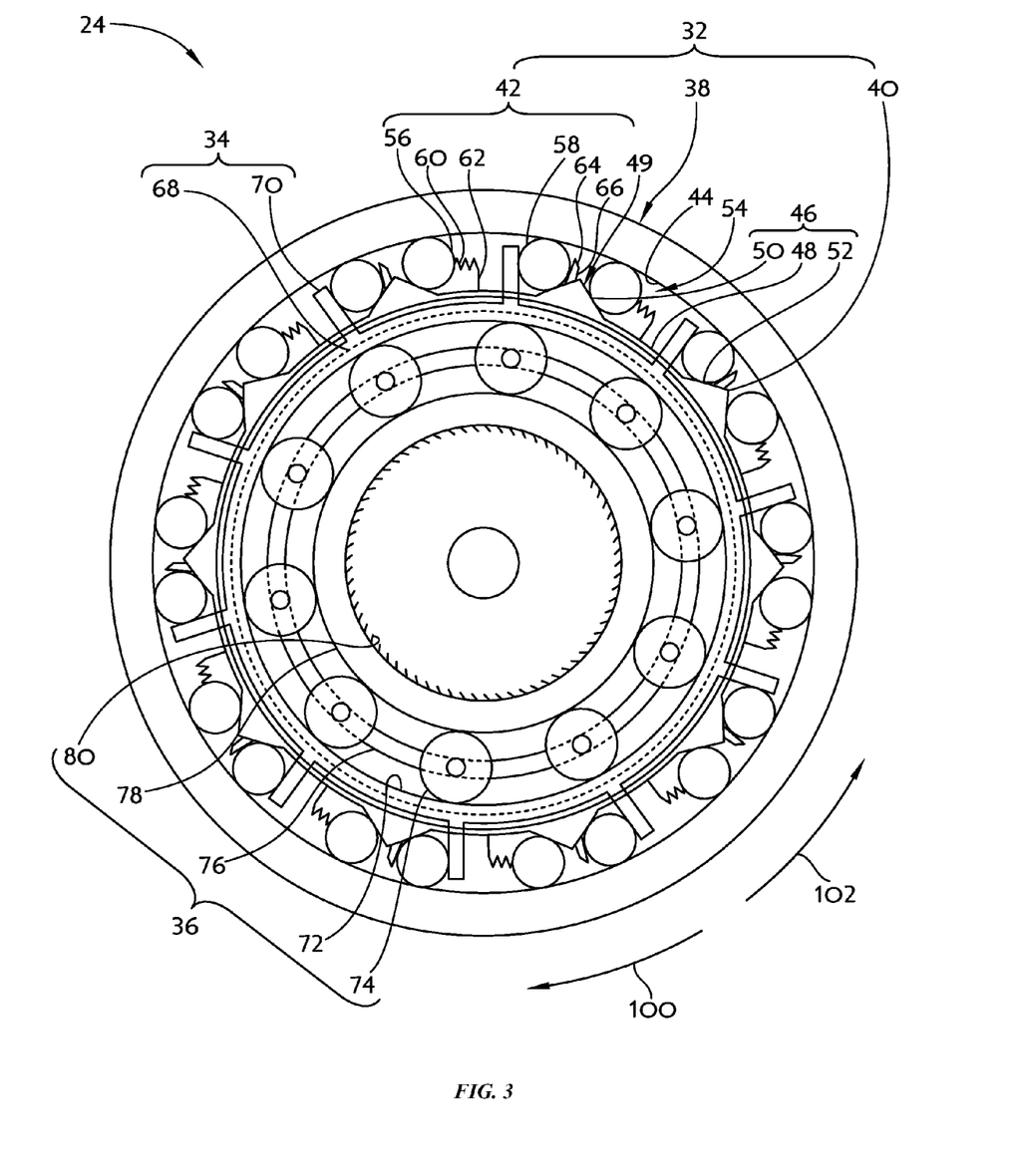
FIG. 3 is an axial, elevation view of at least one embodiment of a direction-sensing roller clutch of the transmission of FIG. 2.

As shown in FIGS. 2 and 3, the clutch engagement assembly 32 includes an outer race 38, an inner race 40, and a plurality of roller sets 42. The outer race 38 is coupled to the variable transmission input shaft 30 for common rotation therewith. Similarly, the inner race 40 is coupled to the rotational receiver 21 for common rotation therewith. The plurality of roller sets 42 are situated between the outer race 38 and the inner race 40.

The outer race 38 is formed to include a cylindrical inner surface 44. The inner race 40 is formed to include a generally cylindrical outer surface 46 opposite the cylindrical inner surface 44 of the outer race 38. The outer surface 46 of the inner race 40 includes a series of arcuate sections 48 defined between corresponding ramped protrusions 49. Each ramped protrusion 49 includes a forward ramp section 50 (i.e., the left side of the ramped protrusion 49 when looking from the drive unit 12 toward the direction-sensing roller clutch 24) and a rearward ramp section 52 (i.e., the right side of the ramped protrusion 49 when looking from the drive unit 12 toward the direction-sensing roller clutch 24). The outer race 38 and the inner race 40 are positioned such that each arcuate section 48, forward ramp section 50, and rearward ramp section 52 of the inner race 40 forms a pocket 54 between the inner surface 44 of the outer race 38 and the outer surface 46 of the inner race 40.

A roller set 42 is positioned in each pocket 54 between the outer race 38 and the inner race 40 as shown in FIG. 3. Each roller set 42 includes a forward roller 56 and a rearward roller 58. The forward roller 56 is biased by a biasing member 60, illustratively a spring, toward contact with the inner surface 44 of outer race 38 and the forward ramp section 50 of the inner race 40. Each spring 60 is coupled to a spring support 62 which is fixed to the inner race 40. Each rearward roller 58 is biased by a spring 64 away from contact with the inner surface 44 of outer race 38 and a rearward ramp section 52 of inner race 40. The spring 64 is coupled to a spring support 66 which is fixed to the inner race 40.

Referring back to FIG. 2, the engagement actuator 34 includes an actuator ring 68 and a plurality of actuation members or fingers 70 extending axially from the actuator ring 68. The actuator ring 68 supports the actuation fingers 70 and is coupled to the actuation planetary gear set 36. Each actuation finger 70 extends into a pocket 54 and is configured to move between an activated position and a deactivated position. In the activated position, shown in FIG. 3, each actuation finger 70 contacts a corresponding rearward roller 58 to move the corresponding rearward roller 58 into contact with the inner surface 44 of the outer race 38 and a rearward ramp section 52 of the inner race 40. Conversely, in the deactivated position, each actuation finger 70 is moved out of contact with or otherwise positioned to allow the corresponding rearward roller 58 to be pushed out of contact with the inner surface 44 of the outer race 38 and a rearward ramp section 52 of the inner race 40 by spring 64.

Figure 4:
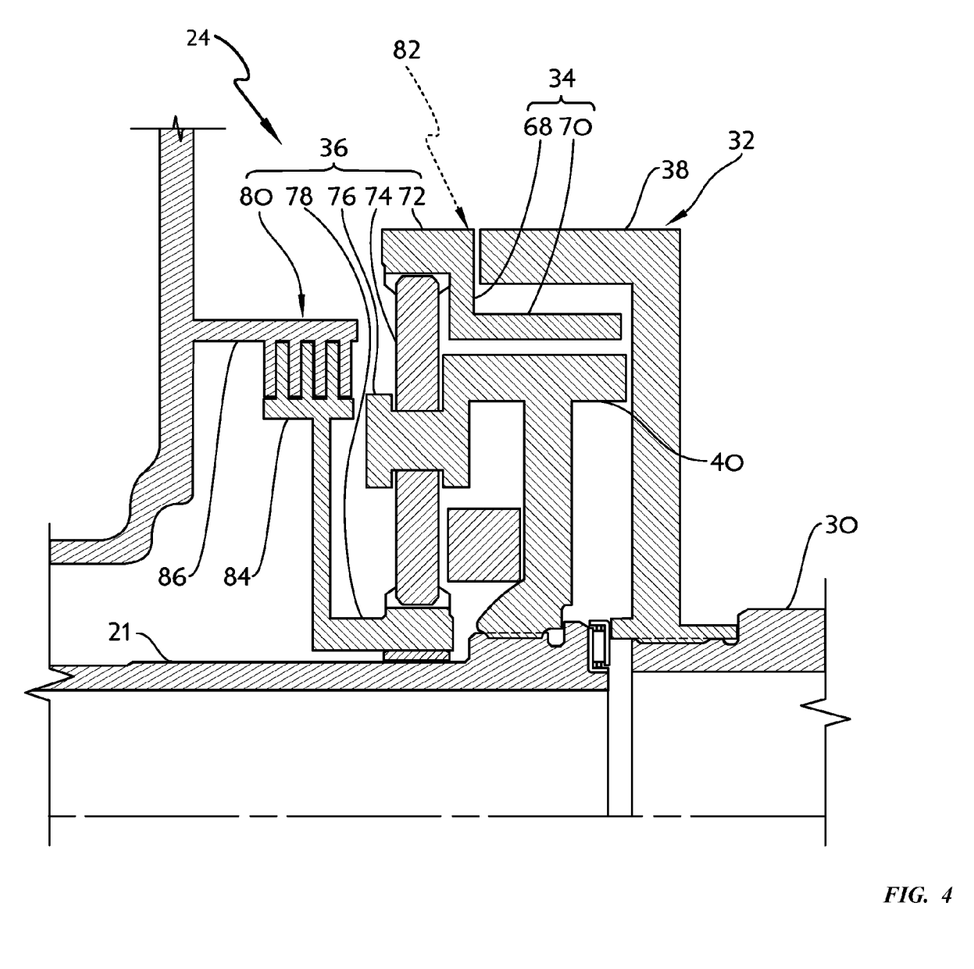
FIG. 4 is a detailed cross-sectional view of the direction-sensing roller clutch of FIG. 3.

Referring now to FIG. 4, the actuation planetary gear set 36 is configured to move the actuator 34 to the activated position when the drive unit output shaft 20 turns in a positive direction and to the deactivated position when the drive unit output shaft 20 turns in a negative direction. The actuation planetary gear set 36 includes a ring gear 72, a plurality of planetary gears 74, a carrier 76 supporting the planetary gears 74, a sun gear 78, and a rotational resistor 80. The ring gear 72 is coupled to the engagement actuator 34 to rotate with the engagement actuator 34. In some embodiments, the ring gear 72 and the engagement actuator 34 may be constructed as a unitary ring gear-actuator 82. The planetary gears 74 intermesh with the ring gear 72 and the sun gear 78. The carrier 76 is coupled to the rotational receiver 21 for common rotation with the drive unit output shaft 20.

The sun gear 78 is coupled to the rotational resistor 80, which applies a resistive torque to the rotation of the sun gear 78. Because the ring gear 72 and the sun gear 78 are each intermeshed with the planetary gears 74, movement of either the ring gear 72 or sun gear 78 causes a reaction at the other of the ring gear 72 or sun gear 78. The resistive torque applied by the rotational resistor 80 causes the sun gear 78 to lag relative to the ring gear 72 such that the ring gear 72 moves relative to the carrier 76. As will be described in further detail below, the relative motion of the ring gear 72 and the carrier 76 causes movement of the rearward rollers 58 into and out of activated position in the pocket 54 to transmit torque through the direction sensing roller clutch 24.

The rotational resistor 80 illustratively includes a plurality of rotating plates 84 and a plurality of fixed plates 86 as shown in FIG. 4. The rotating plates 84 are coupled to the sun gear 78 for common rotation therewith. The fixed plates 86 are grounded to a transmission housing 88 and are spaced from the rotating plates 84. In the illustrative embodiment, a fluid fills a cavity housing the rotational resistor 80. The fluid creates drag between the rotating plates 84 and fixed plates 86, which increases the resistance to rotation of the rotating plates 84 as the speed of the rotating plates 84 increases, thereby increasing the resistive torque to rotation of the sun gear 78. In other embodiments, the rotating plates 84 may frictionally interfere with fixed plates 86 to provide torsional resistance to rotation.

Figure 5A:
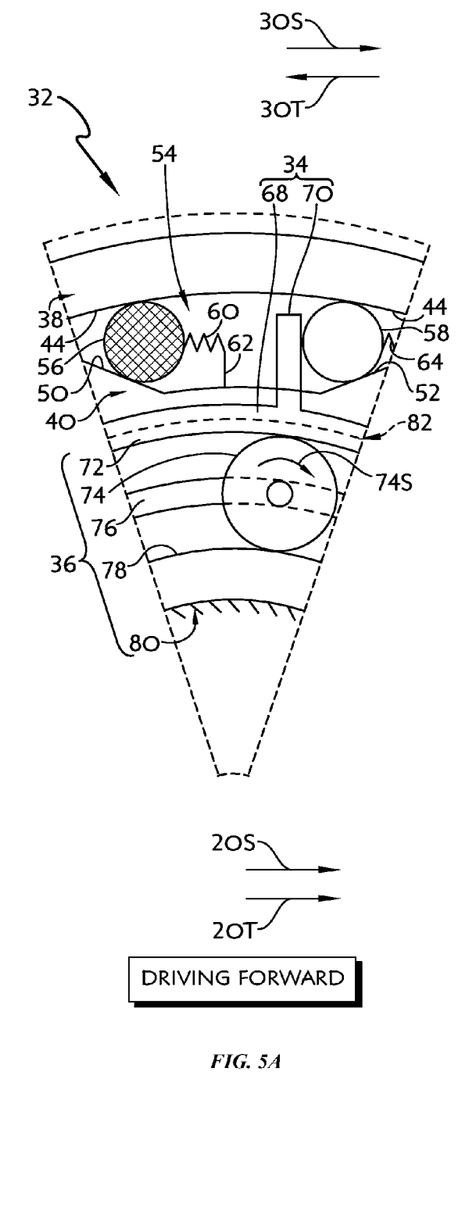
FIG. 5A is an axial view of at least one embodiment of a segment of the direction-sensing roller clutch of FIG. 3 showing the arrangement of the direction-sensing roller clutch when the vehicle power train is in a driving forward mode of operation.
Figure 5B:
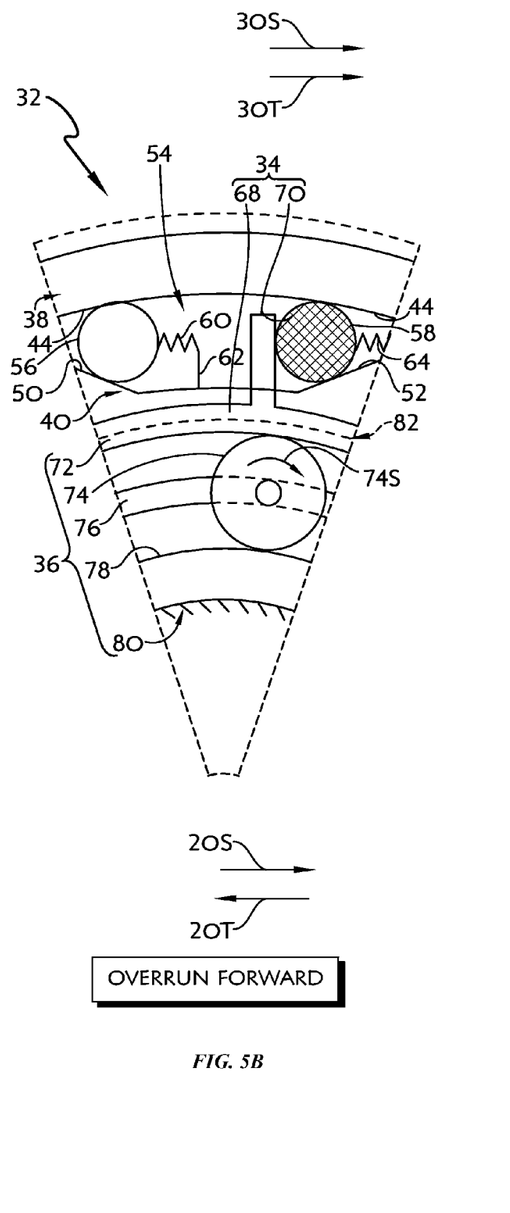
FIG. 5B is an axial view of at least one embodiment of the segment of the direction-sensing roller clutch of FIG. 5A showing the arrangement of the direction-sensing roller clutch when the vehicle power train is in an overrun forward mode of operation wherein the drive unit is overrun by the transmission in a positive direction of rotation.

The actuation planetary gear set 36 moves the actuator 34 to the activated position when the drive unit output shaft 20 rotates in a positive direction to thereby move the rearward roller 56 into contact with the outer race 38 and the inner race 40, as shown in FIGS. 5A and 5B. During positive rotation of the drive unit output shaft 20, the carrier 76 of the actuation planetary gear set 36 rotates in the positive direction with the rotational receiver 21 and the drive unit output shaft 20 as indicated by arrow 20S. The rotation of the carrier 76 applies torque through the planetary gears 74 to the ring gear 72 and the sun gear 78. However, as discussed above, the rotational resistor 80 applies a resistive torque to the sun gear 78 to resist the torque from the drive unit output shaft 20 applied through the planetary gears 74. The result of the resistive torque applied to the sun gear 78 is relative movement between the ring gear 72 and sun gear 78 such that the ring gear 72 moves relative to the carrier 76 and the inner race 40 which is coupled for common rotation with the carrier 76. The movement between the ring gear 72 and the sun gear 78 causes planetary gears 74 to turn in a positive direction as indicated by arrow 74S such that the ring gear 72 and the actuator 34 are rotated relative to the carrier 76 and the inner race 40 in the positive direction as shown in FIGS. 5A and 5B. When the actuator 34 is rotated in the positive direction and overcomes the bias force of the spring 64, the rearward rollers 58 contact the races 38, 40 of clutch engagement assembly 32 as shown in FIGS. 5A and 5B. The contact between the roller 58 and the outer race 38 and inner race 40 causes motion of the inner race 40 in the positive direction to be transferred through the rearward roller 58 to the outer race 38 when the inner race 40 applies a negative torque to the rearward roller 58 and the outer race 38 applies a positive torque to the rearward roller 58. Once the inner race 40 and outer race 38 are coupled to move together via the roller 58, the sun gear 78 and ring gear 72 also move together such that rotation of the drive unit output shaft 20 overcomes the reactive torque of the transmission drive load 18 as well as the resistive torque of the rotational resistor 80.

Figure 5C:
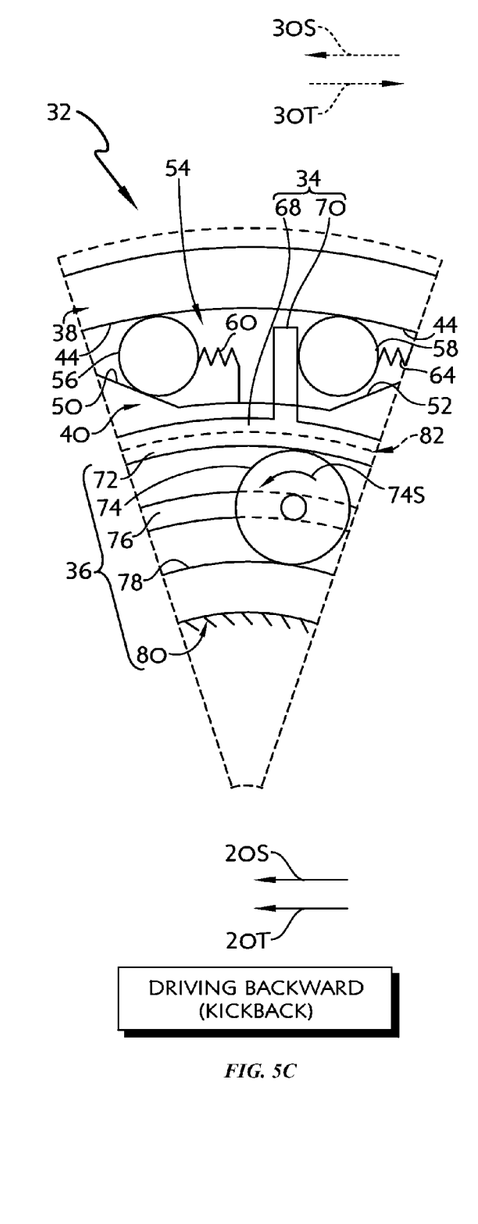
FIG. 5C is an axial view of at least one embodiment of the segment of the direction-sensing roller clutch of FIG. 5A showing the arrangement of the direction-sensing roller clutch when the vehicle power train is in a driving backward (or kickback) mode of operation wherein the drive unit attempts to drive the transmission in a negative direction of rotation.
Figure 5D:
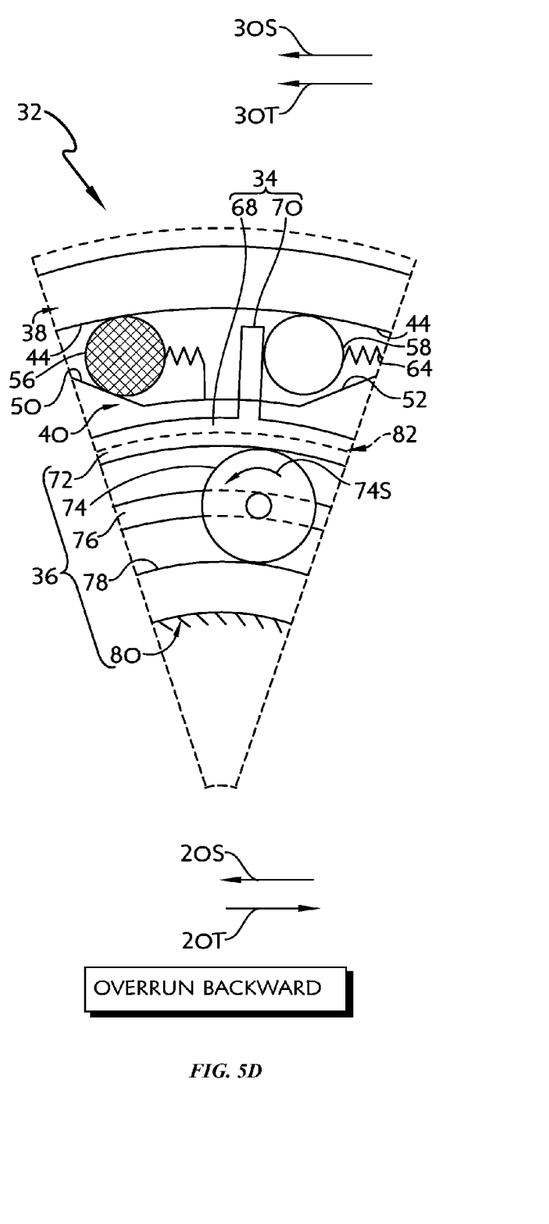
FIG. 5D is an axial view of at least one embodiment of the segment of the direction-sensing roller clutch of FIG. 5A showing the arrangement of the direction-sensing roller clutch when the vehicle power train is in an overrun backward mode of operation wherein the drive unit is overrun by the transmission in a negative direction of rotation.

The actuation planetary gear set 36 moves the actuator 34 to the deactivated position when the drive unit output shaft 20 rotates in a negative direction such that the rearward rollers 58 are moved out of contact with the outer race 38 and/or the inner race 40, as shown in FIGS. 5C and 5D. During negative rotation of the drive unit output shaft 20, the carrier 76 rotates in the negative direction with the rotational receiver 21 and the drive unit output shaft 20 as indicated by arrow 20S. Rotation of the carrier 76 applies torque through the planetary gears 74 to the ring gear 72 and the sun gear 78. Again, as discussed above, the rotational resistor 80 applies a resistive torque to the sun gear 78 to resist the torque from the drive unit output shaft 20 applied through the planetary gears 74. The result of the resistive torque on sun gear 78 is relative movement between the ring gear 72 and the sun gear 78 such that the ring gear 72 moves relative to the carrier 76 and the inner race 40, which is coupled for common rotation with the ring gear 72. The movement between the ring gear 72 and the sun gear 78 causes the planetary gears 74 to turn in a negative direction as indicated by arrow 74S such that the ring gear 72 and the actuator 34 are rotated relative to the carrier 76 and the inner race 40 in the negative direction as shown in FIGS. 5C and 5D. When the actuator 34 is rotated in the negative direction, the rearward rollers 58 are moved out of contact with the outer race 38 and the inner race 40 of the clutch engagement assembly 32 by the bias force of spring 64 as shown in FIGS. 5C and 5D.

Referring back to FIG. 5A, a drive forward mode of drive train 10 is shown wherein the drive unit 12 drives the transmission 14 in a positive direction. The clutch engagement assembly 32 is engaged during the drive forward mode so that power from the drive unit 12 can be used to move the vehicle load 18. In the drive forward mode, the drive unit 12 drives the transmission 14 by applying torque to the rotational receiver 21 and the direction-sensing roller clutch 24 in a positive direction through the drive unit output shaft 20 as indicated by arrow 20T. A reactionary torque is applied in a negative direction by the variable transmission input shaft 30 to the direction-sensing roller clutch 24 as indicated by arrow 30T. As the drive unit 12 drives the transmission 14 in the positive direction, the drive unit output shaft 20 rotates in a positive direction as indicated by arrow 20S and the transmission input shaft 30 rotates in a positive direction as indicated the by arrow 30S.

Each forward roller 56 of the clutch engagement assembly 32 contacts and engages the outer race 38 and the inner race 40 such that that the clutch engagement assembly 32 is engaged during the drive forward mode. Each forward ramp section 50 of the inner race 40 urges the corresponding forward roller 56 toward the outer race 38 in response to the torque interaction of between inner race 40 (coupled to the rotational receiver 21 and the drive unit output shaft 20) and outer race 38 (coupled to the transmission input shaft 30).

The forward roller 56 is thereby wedged between the outer race 38 and the inner race 40. Torque is transmitted through the forward roller 56 between the outer race 38 and the inner race 40 when the forward roller 56 is wedged between the outer race 38 and the inner race 40 as indicated by the shading of forward roller 56 in FIG. 5A.

The rearward roller 58 of the clutch engagement assembly 32 is moved into contact with the outer race 38 and inner race 40 by the engagement actuator 34 during drive forward mode as shown in FIG. 5A. The engagement actuator 34 is moved to the activated position so that the rearward roller 58 contacts outer race 38 and the inner race 40 in response to the drive unit output shaft 20 being rotated in the positive direction. However, the torque interaction of the inner race 40 and the outer race 38 does not force the rearward roller 58 to be wedged between the outer race 38 and the inner race 40. As such, torque is not transmitted by the rearward roller 58 when the drive train 10 is in drive forward mode.

Referring again to FIG. 5B, an overrun forward mode of the drive train 10 is shown wherein the drive unit 12 is overrun (or outpaced) by the transmission 14 in a positive direction. Such a situation may occur when, for example, the vehicle 8 is traveling down a hill and the vehicle 8 is accelerated by gravity. The clutch engagement assembly 32 is engaged during overrun forward mode so that the drive unit 12 can slow the transmission 14. In overrun forward mode, the transmission 14 drives the drive unit 12 by applying torque to the direction-sensing roller clutch 24 in a positive direction through the transmission input shaft 30 as indicated by arrow 30T. A reactionary torque is applied in a negative direction by the drive unit output shaft 20 to the rotational receiver 21 and the direction-sensing roller clutch 24 as indicated by arrow 20T. As the transmission 14 drives the drive unit 12 in the positive direction, the transmission input shaft 30 rotates in a positive direction as indicated by arrow 30S and the drive unit output shaft 20 rotates in a positive direction as indicated by arrow 20S.

The forward rollers 56 of the clutch engagement assembly 32 contact the outer race 38 and the inner race 40 during engine overrun forward mode as shown in FIG. 5B. However, the torque interaction of the inner race 40 and the outer race 38 does not force the forward rollers 56 to be wedged between the outer race 38 and the inner race 40. As such, torque is not transmitted by the forward rollers 56 when the drive train 10 is in engine overrun forward mode.

The rearward rollers 58 of the clutch engagement assembly 32 are moved into contact with the outer race 38 and the inner race 40 by the engagement actuators 34 during engine overrun forward mode as shown in FIG. 5B. Because the drive unit output shaft 20 is rotating in the positive direction, the engagement actuator 34 activates the rearward rollers 58 so that the rearward rollers 58 contact the outer race 38 and the inner race 40. The rearward rollers 58 engage the races 38, 40 so that the clutch engagement assembly 32 is engaged in engine overrun forward mode. The rearward ramp sections 52 of the inner race 40 urge the rearward rollers 58 toward the outer race 38 in response to the torque interaction of the inner race 40 (coupled to rotational receiver 21 and drive unit output shaft 20) and the outer race 38 (coupled to transmission input shaft 30). The rearward rollers 58 are resultantly wedged between the outer race 38 and the inner race 40. Torque is transmitted through the rearward rollers 58 between the outer race 38 and the inner race 40 when the rearward rollers 58 are wedged between the outer race 38 and the inner race 40 as indicated by the shading of rearward roller 58 in FIG. 5B.

Referring again to FIG. 5C, a driving backward, or "kickback," mode which may be experienced by the drive train 10 is shown. Such a set of conditions may be applied to the direction-sensing roller clutch 24, for example, immediately after a diesel engine drive unit 12 is shut down. At shut down, the pressures built up in a diesel engine may overcome the frictional forces in the engine and cause negative rotation of the drive unit output shaft 20. In the driving backward mode, the drive unit 12 attempts to drive the transmission 14 in a negative direction by rotating the drive unit output shaft 20 in a negative direction as indicated by arrow 20S. Rotation of the drive unit output shaft 20 in the negative direction applies torque to the rotation receiver 21 and to the direction-sensing roller clutch 24 in a negative direction as indicated by arrow 20T. However, the clutch engagement assembly 32 of the direction-sensing roller clutch 24 is disengaged during the driving backward mode so that the drive unit output shaft 20 freewheels relative to the variable transmission unit 22. Preventing the drive unit 12 from driving the transmission 14 in the negative direction during the driving backward mode may avoid damage to the variable transmission unit 22.

The forward rollers 56 of the clutch engagement assembly 32 contact the outer race 38 and the inner race 40 during driving backward mode as shown in FIG. 5C. However, the torque interaction of the inner race 40 and the outer race 38 does not force the forward roller 56 to be wedged between the outer race 38 and the inner race 40 and torque is not transmitted by the forward roller 56 when the drive train 10 is in the driving backward mode.

The rearward roller 58 of the clutch engagement assembly 32 is moved out of contact with the outer race 38 and/or the inner race 40 by the spring 64 during the driving backward mode as shown in FIG. 5C. Because the drive unit output shaft 20 is rotated in the negative direction, the engagement actuator 34 is moved to the deactivated position so that the rearward roller 58 is free to move out of contact with the outer race 38 and/or the inner race 40. Since the rearward roller 58 is out of contact with the outer race 38 and the inner race 40, the rearward roller 58 does not transmit torque between the outer race 38 and/or the inner race 40.

Referring again to FIG. 5D, an overrun backward mode of the drive train 10 is shown. In the overrun backward mode, the drive unit 12 is overrun (or outpaced) by the transmission 14 in a negative direction. Such a situation may occur when, for example, the vehicle 8 is fully loaded and stopped on an incline and is rolled backward down the incline by gravity. The clutch engagement assembly 32 is engaged during the overrun backward mode so that the drive unit 12 can slow the transmission 14. In the overrun backward mode, the transmission 14 drives the drive unit 12 by applying torque to the direction-sensing roller clutch 24 in a negative direction through transmission input shaft 30 as suggested by arrow 30T. A reactionary torque is applied in a positive direction by drive unit output shaft 20 to direction-sensing roller clutch 24 as suggested by arrow 20T. As the transmission 14 drives the drive unit 12 in the negative direction, the transmission input shaft 30 rotates in a negative direction as indicated by arrow 30S and the drive unit output shaft 20 rotates in a negative direction as indicated by arrow 20S.

The forward roller 56 of the clutch engagement assembly 32 contacts and engages the outer race 38 and the inner race 40 so that the clutch engagement assembly 32 is engaged during overrun backward mode. The forward ramp section 50 of the inner race 40 urges the forward roller 56 toward the outer race 38 in response to the torque interaction of the inner race 40 and the outer race 38 so that the forward roller 56 is wedged between the outer race 38 and the inner race 40. Torque is transmitted through the forward roller 56 between the outer race 38 and the inner race 40 when the forward roller 56 is wedged between the outer race 38 and the inner race 40 as indicated by the shading of the forward roller 56 in FIG. 5D.

The rearward roller 58 of the clutch engagement assembly 32 is moved out of contact with the outer race 38 and/or the inner race 40 by the spring 64 during the driving backward mode as shown in FIG. 5D. Because the drive unit output shaft 20 is rotated in the negative direction, the engagement actuator 34 is moved to the deactivated position so that the rearward roller 58 is out of contact with the outer race 38 and/or the inner race 40. Since the rearward roller 58 is out of contact with the outer race 38 and/or the inner race 40, the rearward roller 58 does not transmit torque between the outer race 38.

It should be understood that the direction-sensing roller clutch 24 of the present disclosure may be used in other applications wherein single-mode freewheeling of a driver shaft relative to a driven shaft is desired. Specifically, the direction-sensing roller clutch 24 may be incorporated in applications in which it is desirable to (i) disconnect a driver shaft from a driven shaft when the driver shaft turns and applies torque in one direction and (ii) connect the driver shaft and the driven shaft in all other modes of operation. Additionally, it should be appreciated that the direction-sensing roller clutch 24 of the present example can be reversed to provide torque transfer unless an input rotated in a positive direction and applied a positive torque.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A transmission comprising:
   a rotational receiver;
   a variable transmission unit; and
   a direction-sensing roller clutch including an inner race coupled to one of the rotational receiver or the variable transmission unit and an outer race coupled to the other of the rotational receiver or the variable transmission unit, wherein the direction-sensing roller clutch is configured to transmit torque between the inner race and the outer race so that torque is transmitted between the rotational receiver and the variable transmission unit unless the rotational receiver (i) turns in a negative direction and (ii) applies negative torque.

2. The transmission of claim 1, wherein the direction-sensing roller clutch includes a first engagement member situated between the outer race and the inner race, the first engagement member configured engage the outer race and the inner race to transmit torque between the outer race and the inner race only in response to the rotational receiver turning in a positive direction and applying negative torque.

3. The transmission of claim 2, wherein the direction-sensing roller clutch includes a second engagement member situated between the outer race and the inner race, and the second engagement member configured to transmit torque between the outer race and the inner race in response to the rotational receiver applying positive torque while the variable transmission unit applies negative torque.

4. The transmission of claim 2, wherein the direction-sensing roller clutch includes an actuator configured to move the first engagement member into contact with the outer race and the inner race.

5. The transmission of claim 4, wherein the actuator is coupled through a planetary gear set to a rotational resistor.

6. The transmission of claim 4, wherein the actuator is coupled to a planetary gear set.

7. The transmission of claim 6, wherein the planetary gear set includes a carrier coupled for common rotation with the rotational receiver.

8. The transmission of claim 6, wherein the actuator is coupled for common rotation with a ring gear included in the planetary gear set.

9. The transmission of claim 6, wherein the planetary gear set includes a sun gear directly coupled to a rotational resistor.

* * * * *